(12) United States Patent
Sakai (10) Patent No.: US 10,824,187 B2
(45) Date of Patent: Nov. 3, 2020

(54) DIGITAL SIGNAL PROCESSING CIRCUIT, AUDIO DEVICE, AND ELECTRONIC DEVICE

(71) Applicant: ROHM CO., LTD., Kyoto (JP)

(72) Inventor: Mitsuteru Sakai, Kyoto (JP)

(73) Assignee: ROHM CO., LTD., Kyoto (JP)

(*) Notice: Subject to any disclaimer, the term of this patent is extended or adjusted under 35 U.S.C. 154(b) by 217 days.

(21) Appl. No.: 15/598,858

(22) Filed: May 18, 2017

(65) Prior Publication Data

US 2017/0336825 A1 Nov. 23, 2017

(30) Foreign Application Priority Data

May 20, 2016 (JP) .................................. 2016-101439

(51) Int. Cl.
*G06F 3/16* (2006.01)
*G06F 1/10* (2006.01)
*G06F 13/42* (2006.01)

(52) U.S. Cl.
CPC ............... *G06F 1/10* (2013.01); *G06F 3/165* (2013.01); *G06F 13/4282* (2013.01)

(58) Field of Classification Search
CPC ....................................................... G06F 1/10
See application file for complete search history.

(56) References Cited

U.S. PATENT DOCUMENTS

| 5,689,534 A | * | 11/1997 | Anderson | H04H 60/04 375/354 |
| 2006/0132190 A1 | * | 6/2006 | Driediger | G01R 23/005 327/47 |
| 2014/0285245 A1 | * | 9/2014 | Sahara | H03L 7/08 327/147 |

FOREIGN PATENT DOCUMENTS

JP 2013081809 A 5/2013

* cited by examiner

*Primary Examiner* — Kim Huynh
*Assistant Examiner* — Eric Chang
(74) *Attorney, Agent, or Firm* — Cantor Colburn LLP (57) ABSTRACT

A signal processing circuit includes: a clock input terminal configured to receive a master clock from outside: a signal processing part configured to perform a signal processing based on the master clock; an interface circuit configured to communicate with an external circuit; and a clock detection circuit configured to determine, using a serial clock received by the interface circuit, whether the master clock is input.

11 Claims, 10 Drawing Sheets

DIGITAL SIGNAL PROCESSING CIRCUIT, AUDIO DEVICE, AND ELECTRONIC DEVICE

CROSS-REFERENCE TO RELATED APPLICATION

The present invention claims priority under 35 U.S.C. § 119 to Japanese Patent Application No. 2016-101439, filed on May 20, 2016, the entire contents of which are incorporated herein by reference.

TECHNICAL FIELD

The present disclosure relates to a digital signal processing circuit.

BACKGROUND

Figure 1:
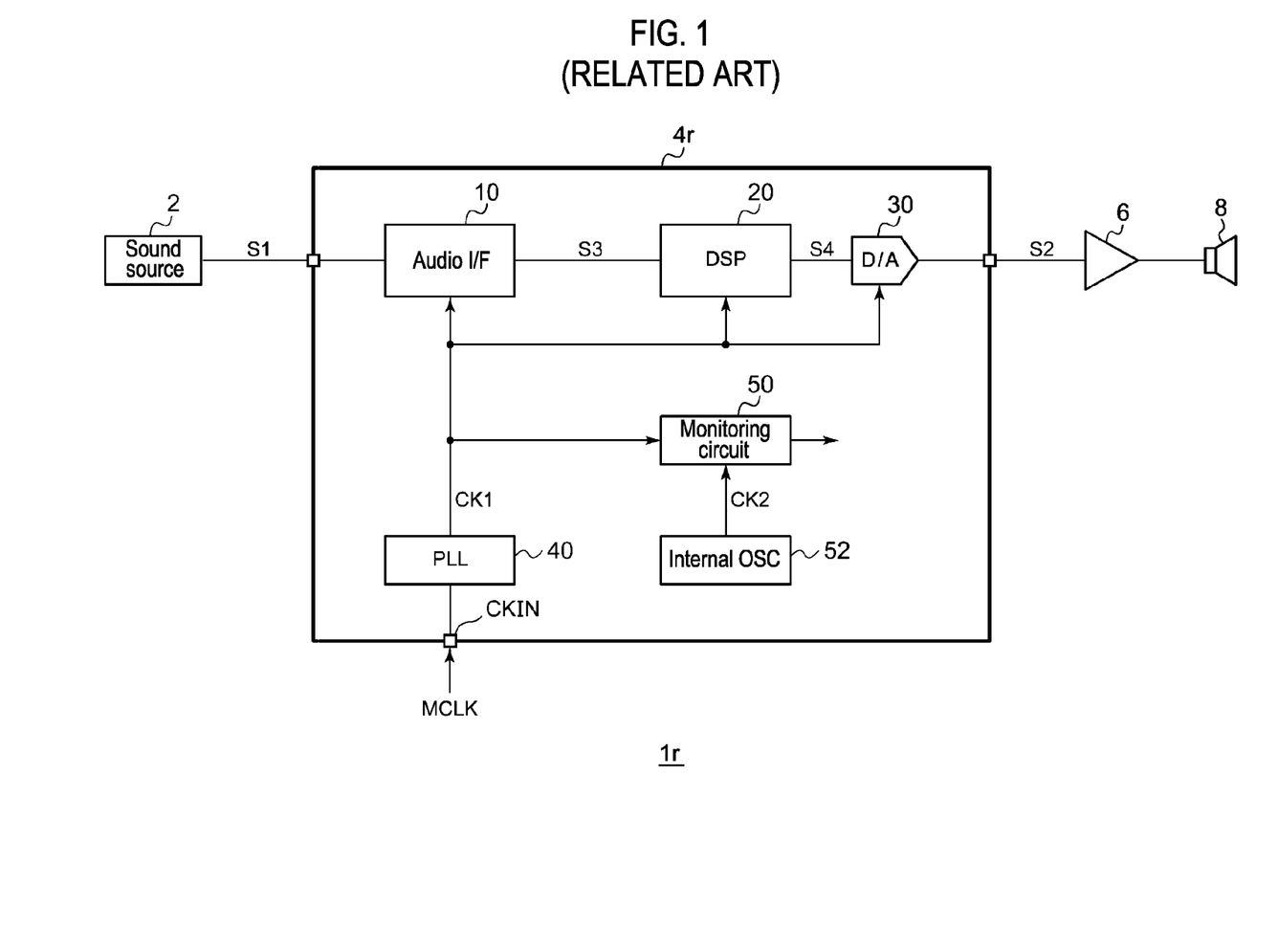
FIG. 1 is a block diagram illustrating a configuration example of an audio system.

An audio amplifier, a car stereo, a car navigation device, or a portable audio player has a sound processor (or an audio signal processing circuit) that performs various signal processing on an audio signal. FIG. 1 is a block diagram illustrating a configuration example of an audio system.

An audio system 1r includes a sound source 2, an audio signal processing circuit 4r, a power amplifier 6, and an electro-acoustic transducer 8. The sound source 2 generates a digital or analog audio signal S1 and outputs the same to the audio signal processing circuit 4r. The audio signal processing circuit 4r receives the audio signal S1 from the sound source 2 and performs necessary digital signal processing to output an analog audio signal S2. The power amplifier 6 amplifies the analog audio signal S2 and drives the electro-acoustic transducer 8 such as a speaker, a headphone or the like.

The audio signal processing circuit 4r mainly includes an audio interface circuit 10, a digital sound processor or a digital signal processor (DSP) 20, a D/A converter 30, a phase locked loop (PLL) circuit 40. The audio interface circuit 10 receives the audio signal S1 from the sound source 2 and outputs a digital audio signal S3. When the audio signal S1 is a digital audio signal, the audio interface circuit 10 includes an interface of an inter IC sound ($I^2S$) standard, and the like. When the audio signal S1 is an analog signal, the audio interface circuit 10 includes an A/D converter, and the like.

The DSP 20 performs a predetermined digital signal processing on the digital audio signal S3. Examples of the digital signal processing include equalizing, bass boosting, travel boosting, stereo-monaural conversion, digital volume control, and the like. The D/A converter 30 converts a processed digital audio signal S4 into the analog audio signal S2.

The audio signal processing circuit 4r requires a clock signal for its operation, and has a clock input terminal CKIN for receiving an input of a master clock MCLK from the outside. An external circuit or a crystal resonator for generating the master clock MCLK is connected to the clock input terminal CKIN. The PLL circuit 40 multiplies the master clock MCLK by N times, generates a main clock CK1, and supplies the generated main clock CK1 to the audio interface circuit 10, the DSP 20, and the D/A converter 30. These circuits operate in synchronization with the main clock CK1.

When the master clock MCLK input to the clock input terminal CKIN is interrupted or stopped or an abnormality occurs therein, the main clock CK1 may not be generated, causing the audio signal processing circuit 4r to be inoperative. Thus, if there is a function of determining whether the master clock MCLK is normal, it contributes to the improvement and reliability of the audio signal processing circuit 4r.

The audio signal processing circuit 4r reviewed by the present inventor has a clock monitoring circuit 50 and an internal oscillator 52 for monitoring the master clock MCLK. The clock monitoring circuit 50 receives the master clock MCLK or the main clock CK1 and determines whether it is normally input. Here, the clock monitoring circuit 50 should be operative even when an abnormality occurs in the master clock MCLK. Thus, since an independent detection clock signal that is not dependent upon the master clock MCLK is required, the internal oscillator 52 for generating a clock signal CK2 for detection is required. However, the internal oscillator 52 causes a problem of increasing the circuit area of the audio signal processing circuit 4r.

Further, when different asynchronous clocks are present within one integrated circuit (IC), an interference therebetween adversely affects surrounding circuits. In particular, in circuits that handle audio signals, the interference of clock signals causes deterioration of sound quality.

SUMMARY

The present disclosure provides some embodiments of a signal processing circuit capable of monitoring a master clock.

According to one embodiment of the present disclosure, there is provided a signal processing circuit. The signal processing circuit includes: a clock input terminal configured to receive a master clock from outside: a signal processing part configured to perform a signal processing based on the master clock; an interface circuit configured to communicate with an external circuit; and a clock detection circuit configured to determine, using a serial clock received by the interface circuit, whether the master clock is input. According to the present embodiment, since the serial clock for communication is used for monitoring the master clock, the internal oscillator is not necessary. Thus, it is possible to reduce the circuit area. When the internal oscillator is present, clock noise is superimposed on a source voltage (power line) or a ground voltage (ground line) due to an oscillation of the internal oscillator, and is propagated to other circuit blocks creating an adverse effect. However, according to the present embodiment, since the serial clock for communication is used, mixing of the clock noises into the power line or the ground line is reduced. Thus, it is possible to suppress an adverse effect on other circuits.

The signal process circuit may be an audio signal processing circuit. In particular, in the audio signal processing circuit, since the clock noise causes deterioration of sound quality, it is possible to suppress the degradation of sound quality by suppressing the clock noise. The audio signal processing circuit may include at least one of an A/D converter and a D/A converter. Since the A/D converter or the D/A converter is easily affected by the clock noise, it is possible to particularly achieve the effect of suppressing the sound quality deterioration.

The external circuit may be a microcomputer, and the interface circuit may be an inter IC ($I^2C$) interface.

The signal processing circuit may further include a register. The clock detection circuit may be configured to write data indicating a detection result of the master clock into a predetermined address in the register. By accessing this address, the microcomputer can recognize whether the master clock is normal or abnormal.

The external circuit may be a microcomputer, and the interface circuit may be a serial peripheral interface (SPI) circuit.

The signal processing circuit may transmit data indicating the detection result of the master clock by the clock detection circuit to the microcomputer via the interface circuit. Since the SPI allows bi-directional communication, the signal processing circuit can notify the microcomputer of an abnormality in the master clock.

The external circuit may be a sound source, and the interface circuit may be an inter-IC sound ($I^2S$) interface circuit or a Sony Philips digital interface (S/PDIF) circuit. The signal processing part may include a D/A converter configured to convert an audio signal received by the interface circuit into an analog signal.

The signal processing part may be configured to mute an output when the master clock is not detected. Thus, it is possible to prevent noise from being output from a speaker or a headphone.

The clock detection circuit may include: a frequency divider configured to frequency-divide the master clock or a main clock obtained by multiplying the master clock; and a level change detection part configured to detect, using the serial clock, a level shift of a frequency-divided clock output from the frequency divider. With this configuration, it is possible to determine whether the master clock is abnormal by using a combination of several flip-flops or latches.

The clock detection circuit may include: a frequency divider configured to frequency-divide the master clock or a main clock obtained by multiplying the master clock; and a frequency counter configured to detect a frequency of a frequency-divided clock output from the frequency divider using the serial clock. In this case, it is possible to detect an abnormality in that the master clock is input but its frequency is different from a designed value.

The clock detection circuit may include a level change detection part configured to detect, using the serial clock, a level shift of a digital signal generated at a predetermined node. The predetermined node may be a node at which the level shift occurs within a predetermined period of time when the master clock is input and the signal processing part normally operates. It is also possible to detect an abnormality by monitoring a signal which is based on the master clock or the main clock, instead of directly monitoring the master clock or the main clock.

The signal processing part may be configured to perform at least one of a digital volume processing, an equalizing processing, a loudness processing, a cross-over filtering, a bass boost processing, and a time alignment processing, on a digital audio signal.

According to another embodiment of the present disclosure, there is provided a car audio device including any one of the signal processing circuits described above.

According to still another embodiment of the present disclosure, there is provided an audio component device including any one of the signal processing circuits described above.

According to a further embodiment of the present disclosure, there is provided an electronic device including any one of the signal processing circuits described above.

Further, arbitrarily combining the foregoing components or substituting the components or expressions of the present disclosure with one another among a method, an apparatus, and a system is also effective as an embodiment of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

First Embodiment

Figure 2:
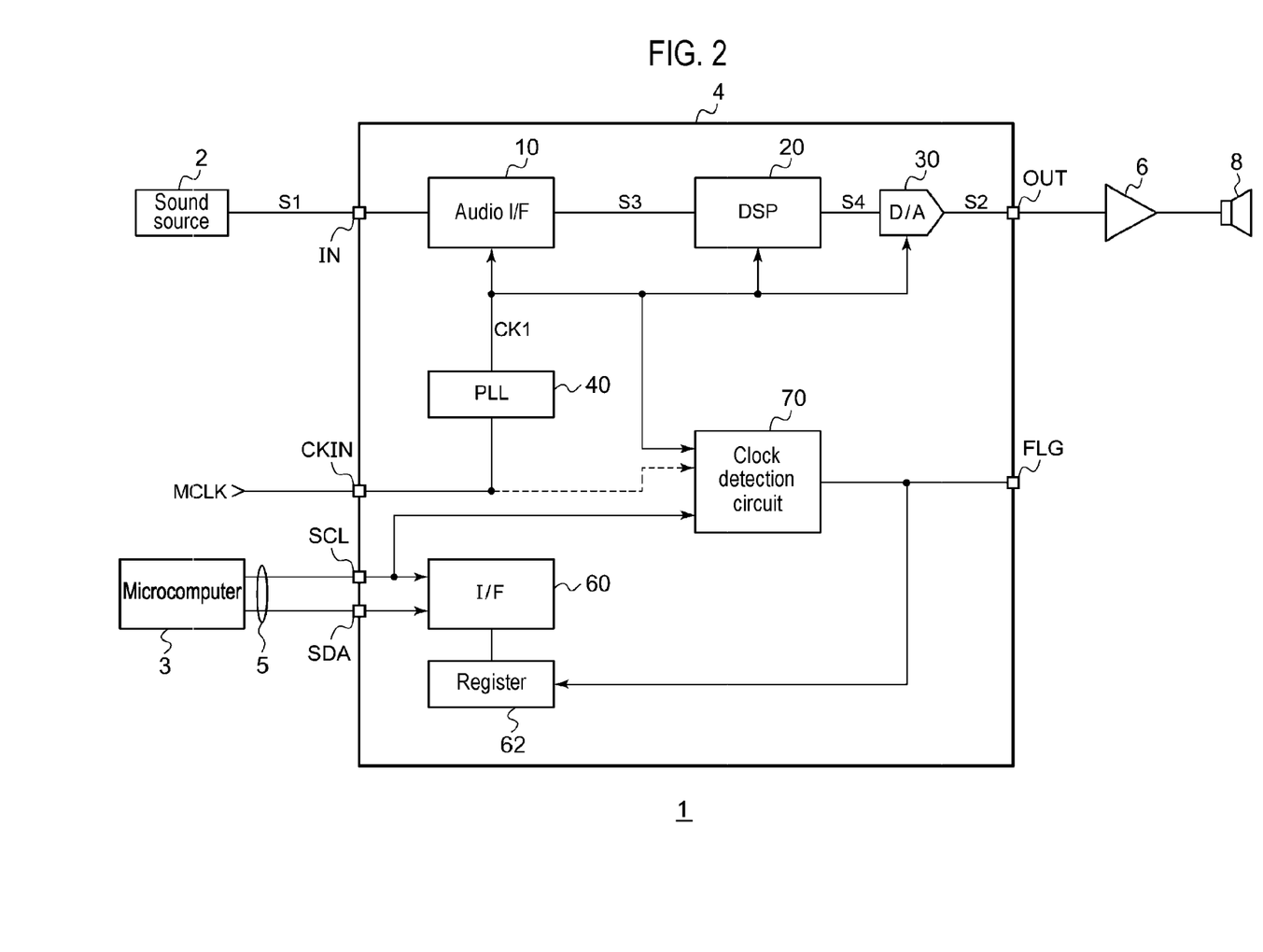
FIG. 2 is a block diagram of an audio system having an audio signal processing circuit according to a first embodiment of the present disclosure.

FIG. 2 is a block diagram of an audio system 1 having an audio signal processing circuit 4 according to a first embodiment of the present disclosure.

The audio system 1 has a sound circuit 2, a microcomputer 3, the audio signal processing circuit 4, a power amplifier 6, and an electro-acoustic transducer 8. The microcomputer 3 integrally controls the audio system 1. The sound source 2, the audio signal processing circuit 4, the power amplifier 6, and the electro-acoustic transducer 8 are the same as those described above with reference to FIG. 1.

The microcomputer 3 and the audio signal processing circuit 4 may communicate with each other, and are connected via a serial interface 5. The type of the serial interface 5 is not particularly limited, and for example, I²C, or SPI may be used. In FIG. 2, the serial interface 5 is an I²C type and includes a clock line SCL and a data line SDA.

Similar to the audio signal processing circuit 4r of FIG. 1, the audio signal processing circuit 4 has an audio interface circuit 10, a DSP 20, a D/A converter 30, a PLL circuit 40, and a clock input terminal CKIN. The audio signal processing circuit 4 is a functional IC integrated on a single semiconductor substrate. Descriptions of the above elements will be omitted.

Further, the audio signal processing circuit 4 has an interface circuit 60, a register 62, and a clock detection circuit 70. The interface circuit 60 communicates with the microcomputer 3 via the serial interface 5. Specifically, the microcomputer 3 transmits configuration data for controlling the audio signal processing circuit 4 to the interface circuit 60. The interface circuit 60 writes the received configuration data into the register 62. The audio interface circuit 10, the DSP 20, the D/A converter 30, and the like operate based on the configuration data written in the register 62. The configuration data may include, for example, a sampling rate of an audio signal S1, a volume value, coefficients of a digital filter embedded in the DSP 20, and the like.

In addition, data obtained as a result of the processing in the DSP 20 is written into the register 62. For example, the DSP 20 incorporates a fast Fourier transform (FFT) circuit therein, which may compute the spectrum of a digital audio signal S3, and periodically writes data indicating the spectrum into the register 62. The microcomputer 3 reads the spectrum data via the serial interface 5 and displays a graphic equalizer on a display (not shown).

The clock detection circuit 70 determines whether the master clock MCLK is input using a serial clock SCL received by the interface circuit 60.

The clock detection circuit 70 may directly monitor the master clock MCLK or may monitor a main clock CK1 obtained by multiplying the master clock MCLK.

A detection result of the clock detection circuit 70 may be variously used.

The clock detection circuit 70 may output a flag (FLG) signal (data) indicating whether the master clock MCLK is normal or abnormal from a flag pin FLG The microcomputer 3 may detect abnormality of the master clock MCLK by monitoring an electrical state of the flag pin FLG The FLG signal may be input to an interrupt pin of the microcomputer 3.

Alternatively, the clock detection circuit 70 may write FLG data indicating a detection result of the master clock MCLK into a predetermined address in the register 62. In this case, the microcomputer 3 may recognize whether the master clock MCLK is normal or abnormal by accessing (reading) the predetermined address.

If the interface circuit 60 can perform bi-directional communication, like a serial peripheral interface (SPI) circuit, the interface circuit 60 may transmit the FLG data to the microcomputer 3.

In some embodiments, when the clock detection circuit 70 cannot detect the master clock MCLK and the FLG signal indicates an abnormality, the DSP 20 fixedly mutes its output S4. Further, the D/A converter 30 also mutes the output. Thus, it is possible to prevent noise from being output from a speaker or a headphone.

Figure 3A:
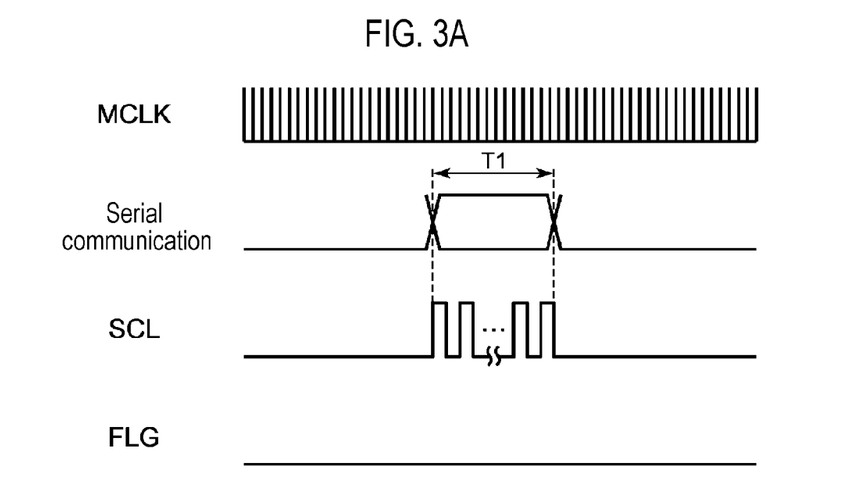
FIGS. 3A and 3B are time charts illustrating an operation of the audio system of FIG. 2.
Figure 3B:
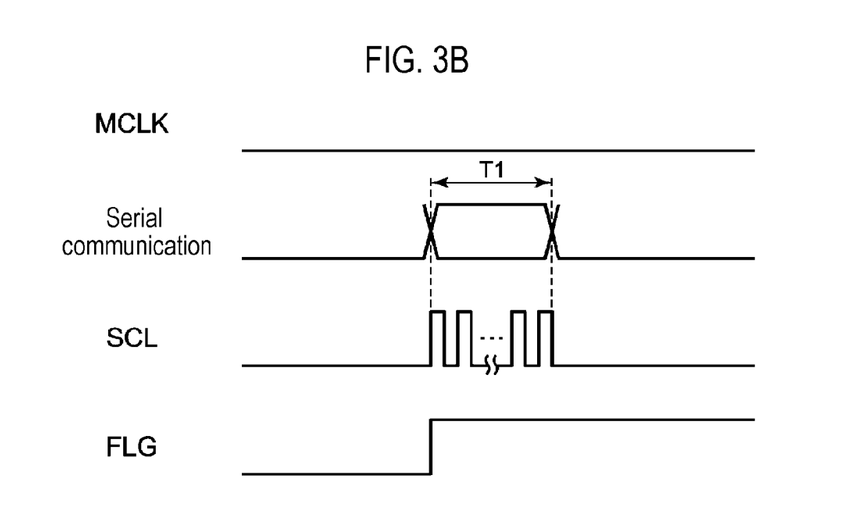

The above is the configuration of the audio signal processing circuit 4. Next, an operation of the audio signal processing circuit 4 will be described. FIGS. 3A and 3B are time charts illustrating the operation of the audio system 1 of FIG. 2. The operation when the master clock MCLK is normal will be described with reference to FIG. 3A. During a period in which serial communication with the microcomputer 3 is not performed, the clock detection circuit 70 is stopped. When serial communication occurs in a section T1, the serial clock SCL is input to the audio signal processing circuit 4. The clock detection circuit 70 determines whether the master clock MCLK is present or absent using the serial clock SCL. When an input of the master clock MCLK is detected, the clock detection circuit 70 keeps negation (e.g., a low level) of an FLG signal (data).

The serial communication is not always performed but periodically occurs. For example, the reading of spectrum data for displaying a graphic equalizer is made several times per second. The refreshing of the register 62 may also occur periodically. These are necessary and sufficient to monitor the master clock MCLK.

Next, the operation when the master clock MCLK is abnormal will be described with reference to FIG. 3B. In the section T1, the clock detection circuit 70 determines whether the master clock MCLK is present or absent using the serial clock SCL. When the master clock MCLK is not input, the clock detection circuit 70 asserts (e.g., a high level) the FLG signal (data).

The above is the operations of the audio signal processing circuit 4 and the audio system 1. According to the audio signal processing circuit 4, since the serial clock SCL for communication is used for monitoring the master clock MCLK, the internal oscillator 52 of FIG. 1 is not necessary. Thus, it is possible to reduce the circuit area.

When the internal oscillator 52 is present, a clock noise is superimposed on a source voltage (power line), a ground voltage (ground line), a bias voltage, or a reference voltage due to an oscillation of the internal oscillator 52, and is propagated to other circuit blocks to make an adverse effect. In particular, in the audio signal processing circuit, the clock noise causes deterioration of sound quality. Specifically, the D/A converter 30 may be easily affected by the clock noise. According to the audio signal processing circuit 4 of FIG. 2, since the serial clock SCL for communication is used, the clock noise is not mixed into the power line. Thus, it is possible to suppress an adverse effect on other circuits and to prevent the sound quality from deteriorating.

The present disclosure is recognized by the block diagram or the circuit diagram of FIG. 2 and intended to cover various devices and circuits derived from the above description, but is not limited to the specific configuration. Hereinafter, a more specific configuration example or embodiment will be described in order to help understand and clarify the essence of the present disclosure and a circuit operation thereof, rather than to narrow the scope of the present disclosure.

Figure 4:
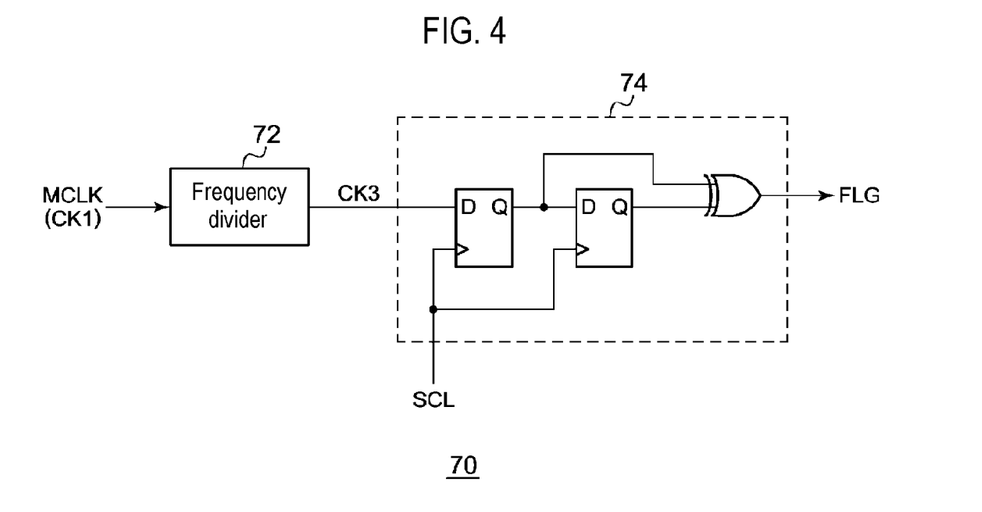
FIG. 4 is a circuit diagram illustrating a configuration example of a clock detection circuit.

FIG. 4 is a circuit diagram illustrating a configuration example of the clock detection circuit 70. The clock detection circuit 70 includes a frequency divider 72 and a level change detection part 74. In most cases, since the frequency of the master clock MCLK (or the main clock CK1) and the frequency of the serial clock SCL are significantly different, it is difficult to directly detect the master clock MCLK using the serial clock SCL. Therefore, the frequency divider 72 divides the frequency of the master clock MCLK (or the main clock CK1). The level change detection part 74 detects a level shift, that is to say, an edge, of the clock CK3 after frequency dividing using the serial clock SCL. The level change detection part 74 may be configured as an edge detection circuit. The configuration of the edge detection circuit is not particularly limited and may include, for example, two-stage flip-flops FF1 and FF2 connected in series and a logic gate for detecting a mismatch between the two flip-flops FF1 and FF2, for example, an XOR gate.

A frequency division ratio of the frequency divider 72 may be determined such that the clock CK3 after frequency dividing includes at least one edge during the length T1 of a single serial communication.

Figure 5:
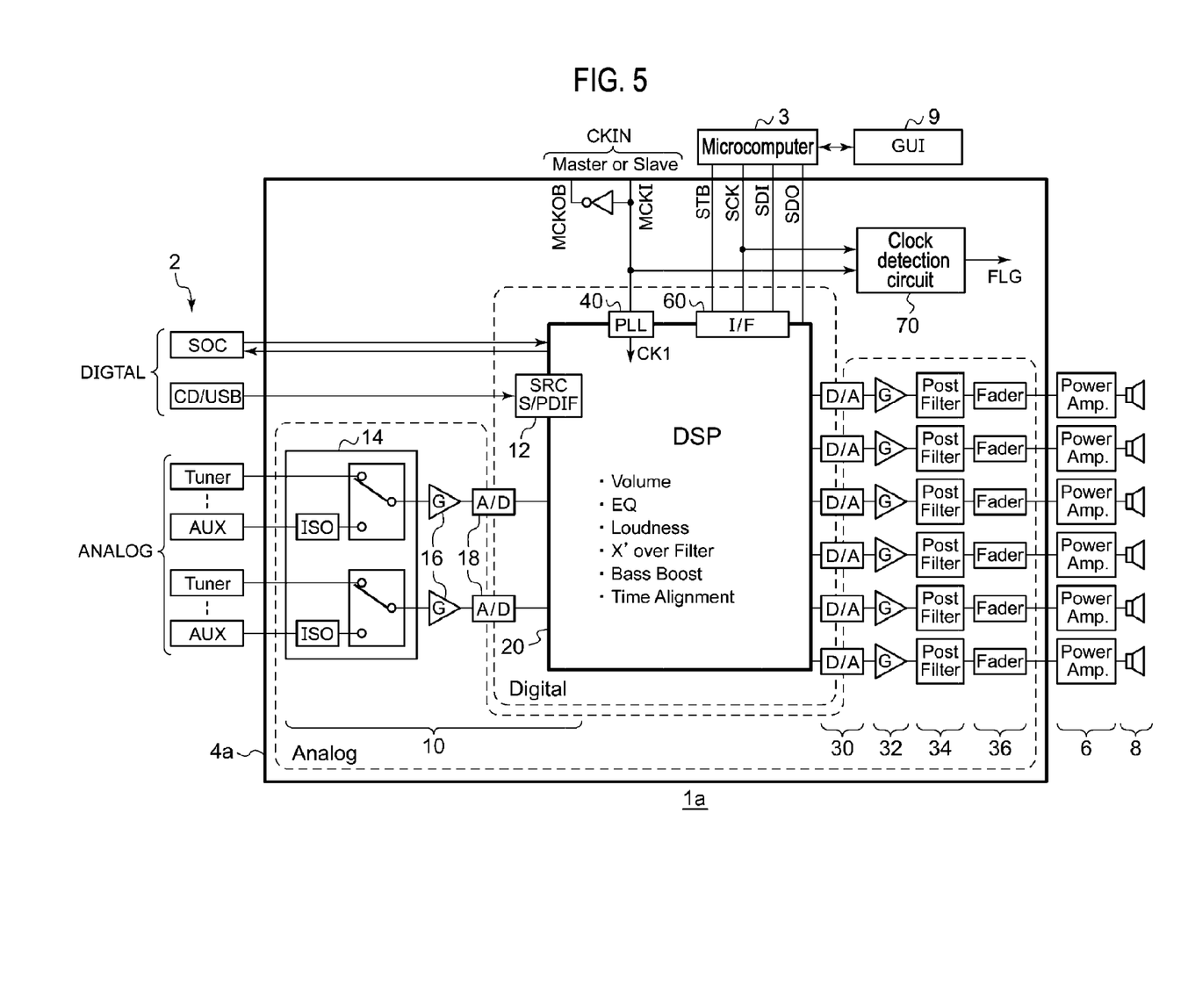
FIG. 5 is a block diagram of an audio system having an audio signal processing circuit.

FIG. 5 is a block diagram of an audio system 1a having an audio signal processing circuit 4a. The audio system 1a is a car audio system, a home audio system, a portable audio, or an electronic device having audio play function.

An audio interface circuit 10 of the audio signal processing circuit 4a may handle both an analog audio signal and a digital audio signal. Thus, the audio interface circuit 10 supports a digital sound source such as an audio system-on-chip (SoC), a CD, or a universal serial bus (USB), or an analog sound source such as a tuner or the like. The audio SoC is a chip in which a decoder of compressed audio data such as MP3, WMA, AAC, FLAC, WAV or the like stored in a USB memory or an SD memory, a servo circuit of a CD, a decoder circuit of a CD, and the like are integrated. An S/PDIF (or I$^2$S) is installed as a digital interface 12 in the audio signal processing circuit 4a to support a sampling rate conversion function.

An input multiplexer 14 selects one of a plurality of systems of analog audio signals. A stereo input is provided as an analog input, and thus, a selector is installed for each of left and right channels (Lch and Rch). Analog amplifiers 16 amplify analog audio signals of a system selected by the input multiplexer 14. Gains of the analog amplifiers 16 may be individually set by systems. A/D converters 18 convert the analog audio signals of Lch and Rch into a digital signal.

The DSP 20 processes a digital audio signal from the digital interface 12 or the A/D converters 18. The DSP 20 includes functions such as a digital volume processing, an equalizing processing, a loudness processing, a cross-over filtering, a bass boost processing, a time alignment processing, and the like. The configuration data of the processing in the DSP 20 is transmitted from the microcomputer 3. In FIG. 5, an interface circuit 60 is a serial peripheral interface (SPI). The clock detection circuit 70 determines whether a master clock input to a clock input pin is present using the serial clock SCK.

A graphical user interface (GUI) 9 includes a display panel, a button, a switch, and the like. The microcomputer 3 receives a user's instruction input, for example, selection of an input system, a gain of the analog amplifiers 16 by systems, a set value of an analog or digital volume and the like, via the GUI 9, and generates configuration data based on the user's instruction. The microcomputer 3 transmits the generated configuration data to the interface circuit 60.

The DSP 20 branches input of two channels L and R into six channels. A D/A converter 30 is installed for each channel. An amplifier 32, a post filter 34, a fader volume 36, and the like are installed at a subsequent stage of the D/A converter 30.

Second Embodiment

Figure 6:
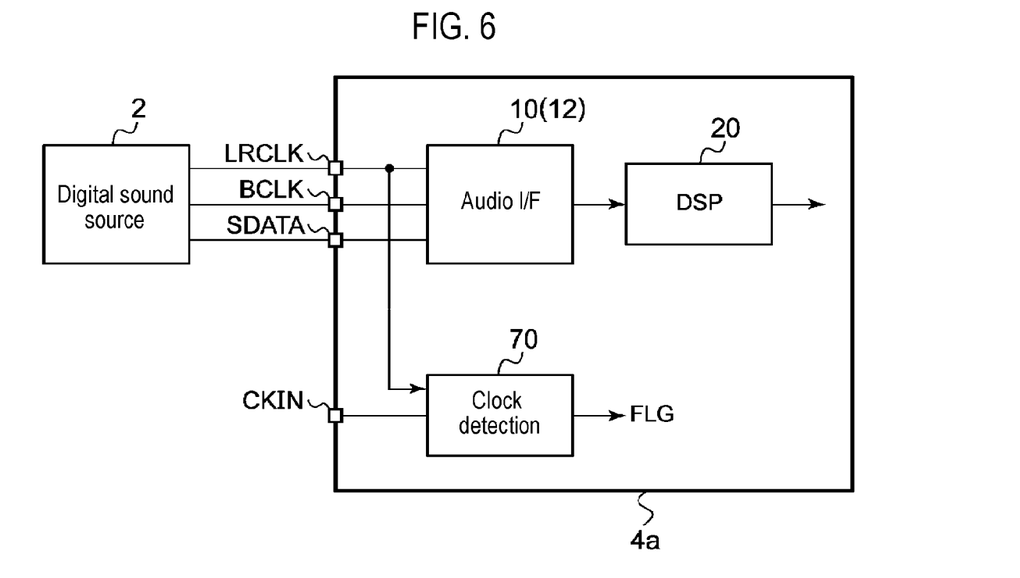
FIG. 6 is a block diagram of an audio signal processing circuit according to a second embodiment of the present disclosure.

In the first embodiment, the microcomputer 3 and the serial clock SCL (SCK) for serial communication are used in order to monitor the master clock MCLK, but the present disclosure is not limited thereto. As described above, when the sound source 2 is a digital sound source, serial transmission such as I$^2$S or S/PDIF is used for a digital audio signal from the sound source 2. FIG. 6 is a block diagram of an audio signal processing circuit 4a according to a second embodiment of the present disclosure.

For example, in I$^2$S, audio data is transmitted using three lines of an L/R clock LRCLK (or WDCLK) for distinguishing between an L channel and an R channel, a bit clock BLCK (serial clock SCLK), and serial data SDATA. The clock detection circuit 70 determines whether the master clock MCLK is input using one of the bit clock BCLK and the L/R clock LRCLK. The second embodiment can be applied to a circuit without having an interface with a microcomputer.

Applications

Figure 7:
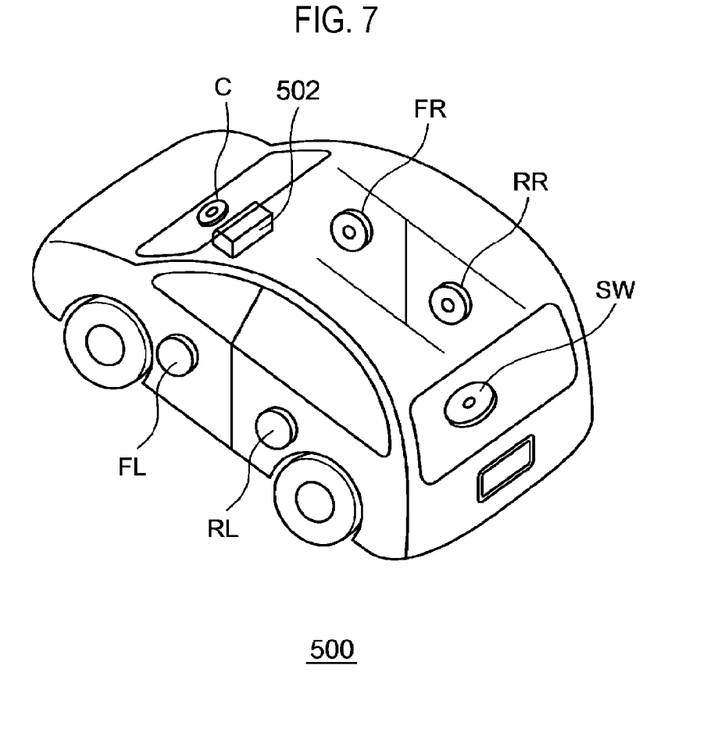
FIG. 7 is a view illustrating an automobile having an audio signal processing circuit.

Applications of the audio signal processing circuit 4 will be described. FIG. 7 is a view illustrating an automobile 500 having the audio signal processing circuit 4. An audio system mounted on the automobile 500 is configured as a 5.1 channel system (a front right FR, a rear right RR, a front left FL, a rear left RL, a center C, and a sub-woofer SW).

The automobile 500 has six speakers C, FL, FR, RL, RR, and SW. A head unit 502 is an audio device that incorporates the microcomputer 3, the audio signal processing circuit 4, and the power amplifier 6 of FIG. 2 therein, and is an audio-equipped navigation device, a CD player, a DVD player, or the like. The head unit 502 incorporates the power amplifier 6 therein and drives the six speakers. The power amplifier 6 may be installed outside the head unit 502.

The audio signal processing circuit 4 may also be used in an audio component (audio device) of a home audio system, as well as in a car audio device. In addition, the audio signal processing circuit 4 may be mounted on an electronic device such as a television, a desktop computer, a laptop computer, a tablet terminal, a smartphone, a digital camera, a portable audio player, or the like.

Figure 8A:
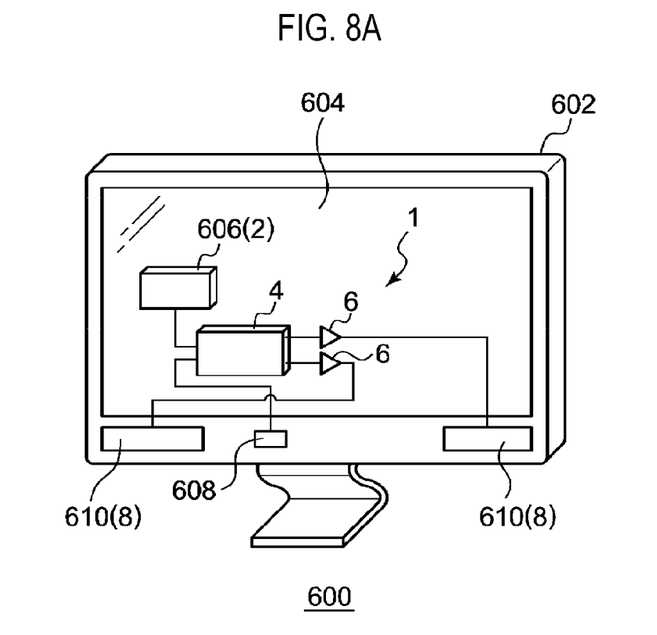
FIGS. 8A and 8B are external views of an electronic device and an audio component device, respectively.
Figure 8B:
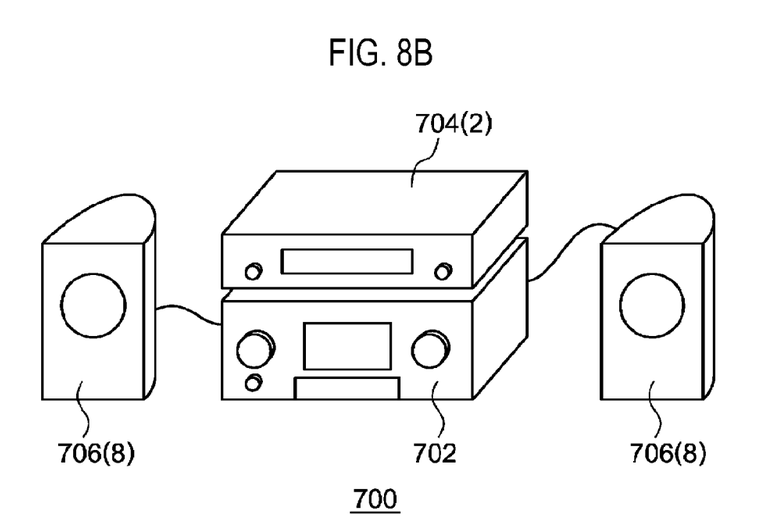

FIGS. 8A and 8B are external views of an electronic device and an audio component device, respectively. FIG. 8A is a television 600 which is an example of an electronic device. The television 600 has a housing 602, a display panel 604, a tuner 606, an external input terminal 608, and the aforementioned audio system 1. The tuner 606 corresponds to the sound source 2 and generates an audio signal. The external input terminal 608 may be a high-definition multimedia interface (HDMI®) terminal, a USB terminal, a digital visual interface (DVI) terminal, or the like, to which an external device (not shown) having a sound source is connected. The audio signal processing circuit 4 receives an audio signal from the tuner 606 or the external device. The audio system 1 is a 2 channel system, and the power amplifier 6 and the speaker 610 are installed in each of a channel L and a channel R. The electronic device may be a smartphone, a tablet computer, a laptop computer, or a digital camera or a video camera having an audio play function.

FIG. 8B is a home audio device 700. The home audio device 700 has an amplifier 702, a player 704, and speakers 706. Here, a 2 channel system is illustrated, but the number of channels is not limited and a 5.1 channel system, a 6.1 channel system, a 7.1 channel system, and a 9.1 channel system may be used.

The player 704 is a CD player, a DVD player, a Blu-ray player, a USB audio player, and the like. The amplifier 702 includes the aforementioned audio signal processing circuit 4 and the power amplifier 6 and drives a speaker 706.

The present disclosure has been described above based on the embodiments. It is to be understood by those skilled in the art that the embodiments are merely illustrative and may be differently modified by any combination of the components or processes, and the modifications are also within the scope of the present disclosure. Hereinafter, these modifications will be described.

First Modification

Figure 9A:
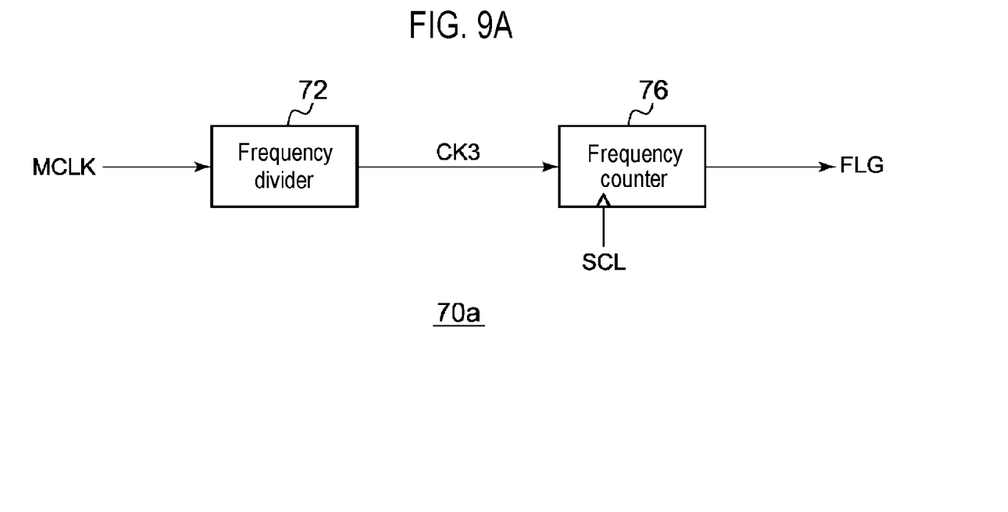
FIGS. 9A and 9B are circuit diagrams of clock detection circuits according to first and second modifications, respectively.

FIG. 9A is a circuit diagram of a clock detection signal 70a according to a first modification. The clock detection circuit 70a includes a frequency counter 76 instead of the level change detection part 74. The frequency counter 76 detects a frequency of a frequency-divided clock CK3 output from the frequency divider 72 using the serial clock SCL. According to this modification, it is possible to detect an abnormity in that the master clock MCLK is input but its frequency is different from a designed value.

Second Modification

Figure 9B:
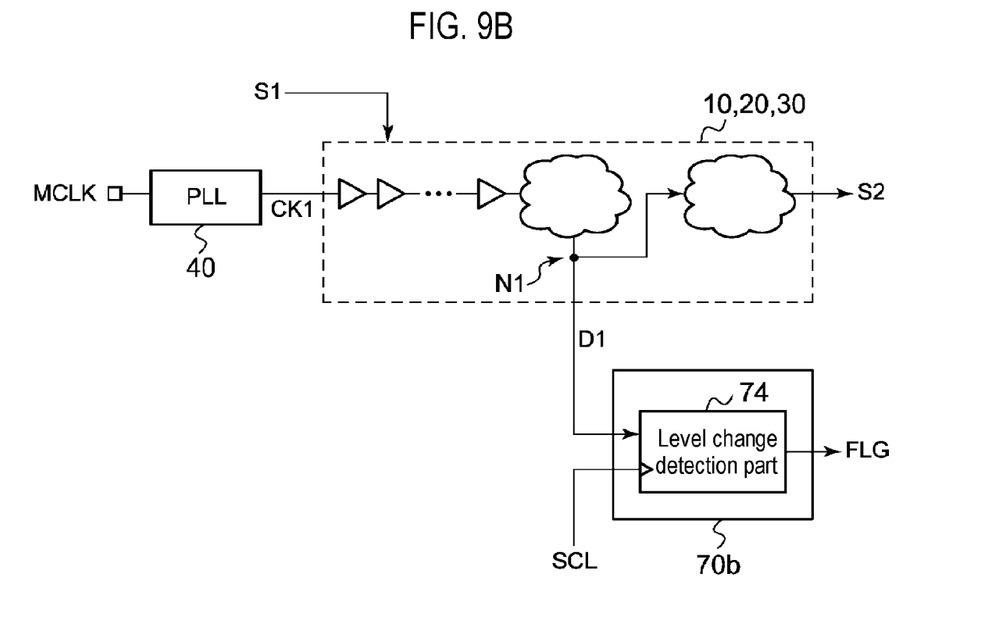

FIG. 9B is a circuit diagram of a clock detection circuit 70b according to a second modification. The level change detection part 74 detects a level shift (edge) of a digital signal D1, which is generated at a predetermined node N1 in the audio interface circuit 10, the DSP 20, and the D/A converter 30, using the serial clock SCL. The predetermined node N1 is a node at which a level shift occurs within a predetermined period of time, that is to say, within a single serial transmission section, when the master clock MCLK is input and the DSP 20 normally operates. It is also possible to detect an abnormity by monitoring a signal D1 which is based on the master clock MCLK or the main clock CK1, instead of directly monitoring the master clock MCLK or the main clock CK1.

Third Modification

Figure 10A:
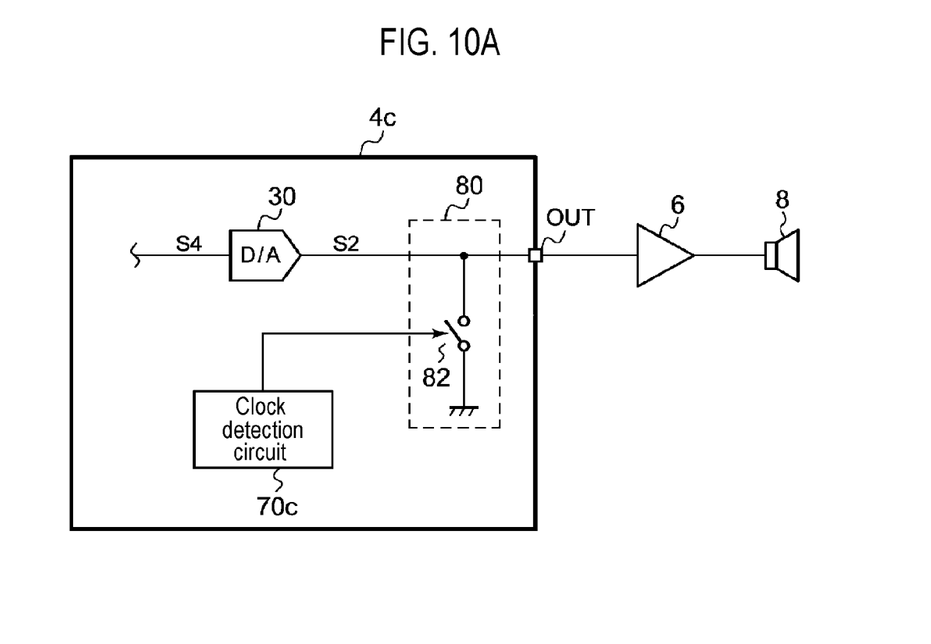
FIGS. 10A and 10B are block diagrams of audio signal processing circuits according to third and fourth modifications, respectively.

FIG. 10A is a block diagram of an audio signal processing circuit 4c according to a third modification. The audio signal processing circuit 4c has a mute circuit 80 at its output stage. When a clock detection circuit 70c fails to detect the master clock MCLK, the mute circuit 80 is activated and an electric potential of the output terminal OUT is fixed to enter a mute state. The mute circuit 80 is installed between the output terminal OUT and a fixed voltage line (e.g., a ground line) and may include a switch 82 switched on in an active state (i.e., a mute state) of the mute circuit 80. The fixed voltage line may be a line at which a median voltage of a source voltage and a ground voltage is generated.

Fourth Modification

Figure 10B:
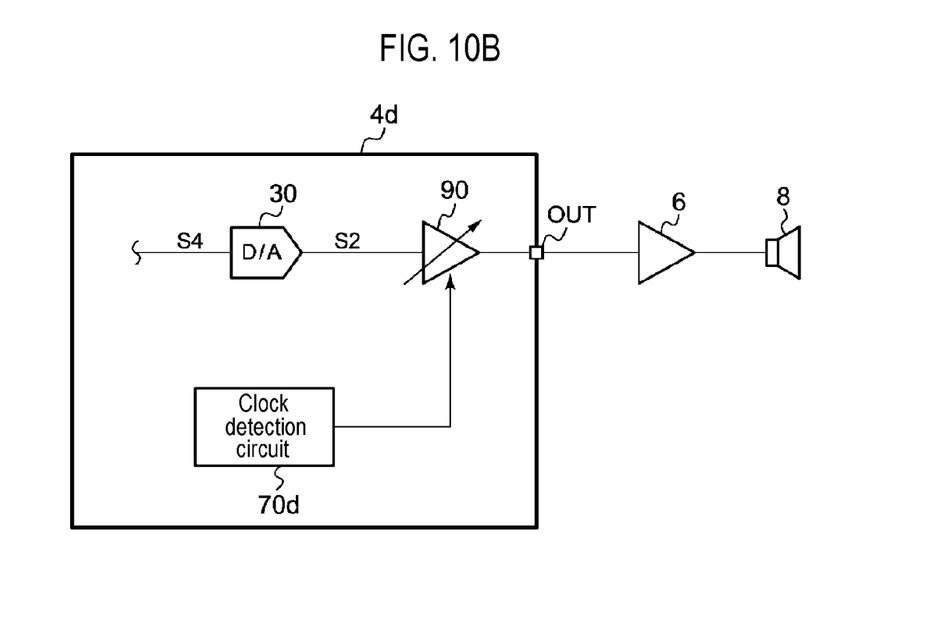

FIG. 10B is a block diagram of an audio signal processing circuit 4d according to a fourth modification. The audio signal processing circuit 4d has an analog volume circuit 90 at its output stage. When a clock detection circuit 70d fails to detect the master clock MCLK, a gain of an analog volume circuit 90 is set to be substantially zero ($-\infty$) and an electric potential of the output terminal OUT is fixed to enter a mute state.

Fifth Modification

In the embodiments, the audio signal processing circuit 4 for processing an audio signal has been described. However, the application of the present disclosure is not limited thereto and may be applied to an IC or a discrete circuit of various applications. In particular, the present disclosure is effective for an analog/digital combination circuit incorporating a D/A converter or an A/D converter therein that may be easily affected by a clock noise of a power plane and a ground plane.

According to the present disclosure in some embodiments, it is possible to detect an abnormality of a master clock.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A signal processing circuit, comprising:
a clock input terminal configured to receive a master clock from outside;
a signal processor configured to perform a signal processing based on the master clock;
a data interface circuit configured to communicate with a first external circuit;
an audio interface circuit configured to communicate with a second external circuit;
a clock detection circuit configured to detect the master clock;
a register in which first data received by the data interface circuit, second data obtained as a result of the signal processing in the signal processor, and third data indicating a detection result of the master clock by the clock detection circuit are written;
a D/A converter configured to convert an audio signal received by the audio interface circuit into an analog signal;
a phase locked loop circuit configured to:
multiply the master clock to generate a main clock; and
supply the main clock to the audio interface circuit, the signal processor, the D/A converter, and the clock detection circuit; and
a mute circuit connected to the D/A converter and an output terminal of the signal processing circuit, and including a switch, which is controlled based on the third data output from the clock detection circuit and switched on when the third data indicates an abnormality,
wherein the third data output from the clock detection circuit is output from a flag pin of the signal processing circuit and input to the register,
wherein the mute circuit is controlled based on the third data, and
wherein the clock detection circuit is configured to include:
a frequency divider configured to frequency-divide the main clock and output a frequency-divided clock; and
a level change detection part configured to determine, using the frequency-divided clock and a serial clock received by the data interface circuit, whether the master clock is input.

2. The signal processing circuit of claim 1, wherein the signal processing circuit is an audio signal processing circuit.

3. The signal processing circuit of claim 1, wherein the first external circuit is a microcomputer, and
wherein the data interface circuit is an inter IC (I²C) interface.

4. The signal processing circuit of claim 1, wherein the first external circuit is a microcomputer, and
wherein the data interface circuit is a serial peripheral interface (SPI) circuit.

5. The signal processing circuit of claim 4, wherein the third data is transmitted to the microcomputer via the data interface circuit.

6. The signal processing circuit of claim 1, wherein the second external circuit is a sound source, and
wherein the audio interface circuit is an inter-IC sound (I²S) interface circuit or a Sony Philips digital interface (S/PDIF) circuit.

7. The signal processing circuit of claim 1, wherein
the level change detection part is configured to detect, using the serial clock, a level shift of the frequency-divided clock output from the frequency divider.

8. The signal processing circuit of claim 1, wherein the signal processor is configured to perform at least one of a digital volume processing, an equalizing processing, a loudness processing, a cross-over filtering, a bass boost processing, and a time alignment processing, on a digital audio signal.

9. The signal processing circuit of claim 1, wherein the signal processing circuit is integrated on a single semiconductor substrate.

10. An audio device having the signal processing circuit of claim 1.

11. An electronic device having the signal processing circuit of claim 1.

* * * * *